US006987902B2

(12) United States Patent
Verhaege et al.

(10) Patent No.: US 6,987,902 B2
(45) Date of Patent: Jan. 17, 2006

(54) BRANCHING UNIT WITH RECONFIGURABLE TERMINAL CONNECTIONS

(75) Inventors: Thierry Verhaege, Saulx-les-Chartreux (FR); Alain Cordier, Vaux-le-Penil (FR); Patrick Mejasson, Thornton Heath (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/774,502

(22) Filed: Feb. 10, 2004

(65) Prior Publication Data

US 2004/0156602 A1 Aug. 12, 2004

(30) Foreign Application Priority Data

Feb. 11, 2003 (FR) .................................. 03 01585

(51) Int. Cl.
G02B 6/28 (2006.01)
(52) U.S. Cl. ......................................... 385/24; 385/101
(58) Field of Classification Search .................. 385/24, 385/16, 31, 101, 147; 439/577
See application file for complete search history.

(56) References Cited

U.S. PATENT DOCUMENTS

| 3,710,137 | A | * | 1/1973 | Stephens, Jr. ............... 307/141 |
| 4,179,652 | A | * | 12/1979 | Davis .......................... 324/715 |
| 4,261,641 | A | * | 4/1981 | Porter ......................... 385/24 |
| 6,005,996 | A | * | 12/1999 | Webb .......................... 385/24 |
| 6,208,441 | B1 | * | 3/2001 | Jones et al. .................. 398/87 |
| 2004/0063339 | A1 | * | 4/2004 | Stone et al. ................. 439/43 |

FOREIGN PATENT DOCUMENTS

| EP | 0 495 509 A2 | 7/1992 |
| EP | 1 220 469 A1 | 7/2002 |

* cited by examiner

Primary Examiner—Chandrika Prasad
(74) Attorney, Agent, or Firm—Sughrue Mion, PLLC

(57) ABSTRACT

A branching unit integrated into a submarine telecommunication system comprising three cables having optical and electrical transmission members comprises three terminals connected to the electrical transmission members of the cables, three input points, and three electrical contacts each between one of the terminals and one of the input points. In an operating configuration, and at a given time, a first terminal and a second terminal are electrically connected together and form a trunk segment adapted to convey a trunk current, and a third terminal is electrically connected to a submarine ground to form a branch segment adapted to convey a branch current. The branching unit carries out reconfiguration by controlling switching of the electrical contacts. A voltage indicating the potential at a point on the trunk segment is measured. Because an optical reconfiguration request is made by means of an optical reconfiguration signal the unit is able to receive and process optical reconfiguration signals. Reconfiguration is validated according to the measured voltage and to the signals received and processed and reconfiguration in accordance with the optical reconfiguration signal is activated only if the absolute value of the potential is below a threshold.

15 Claims, 2 Drawing Sheets

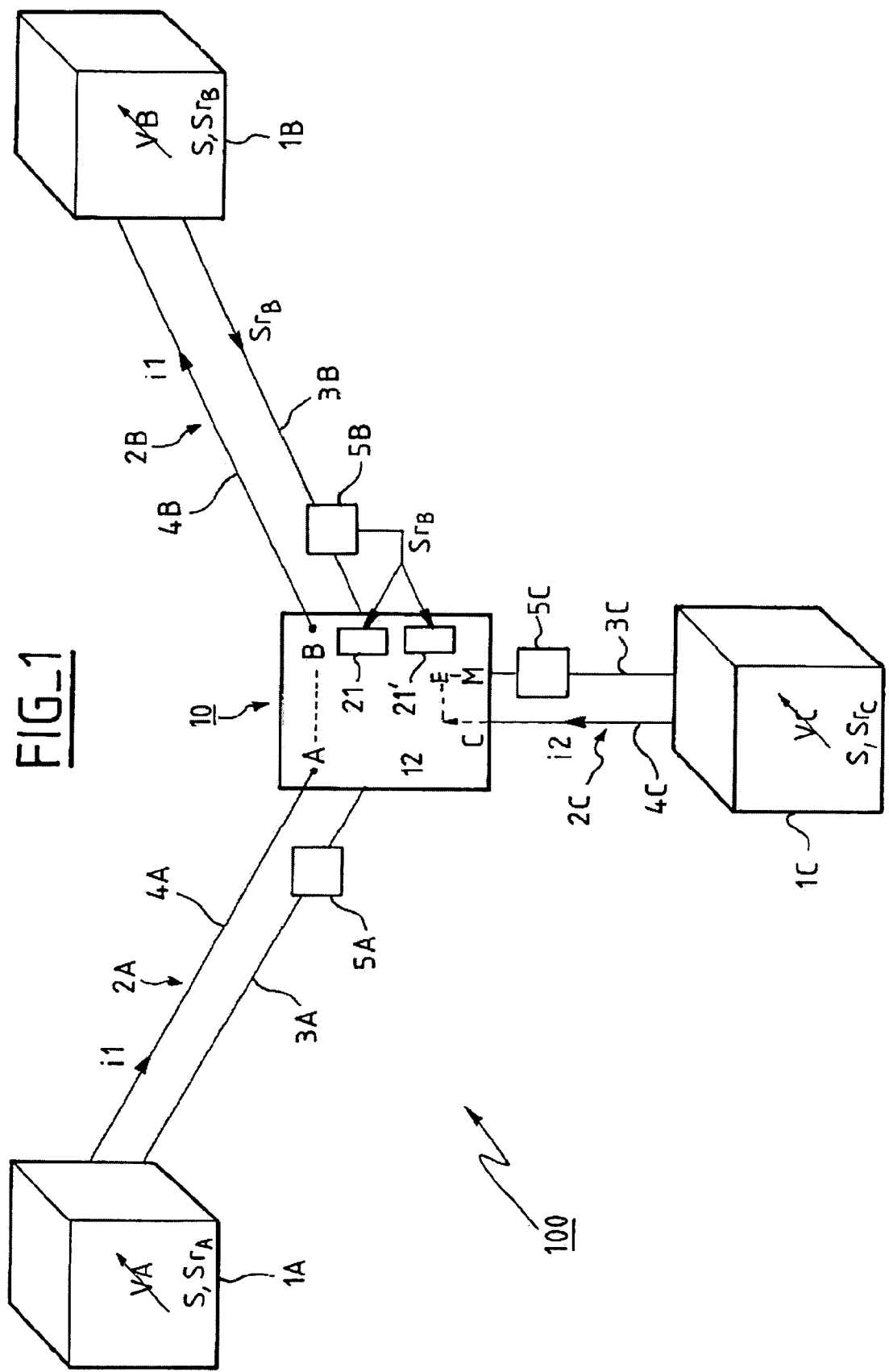

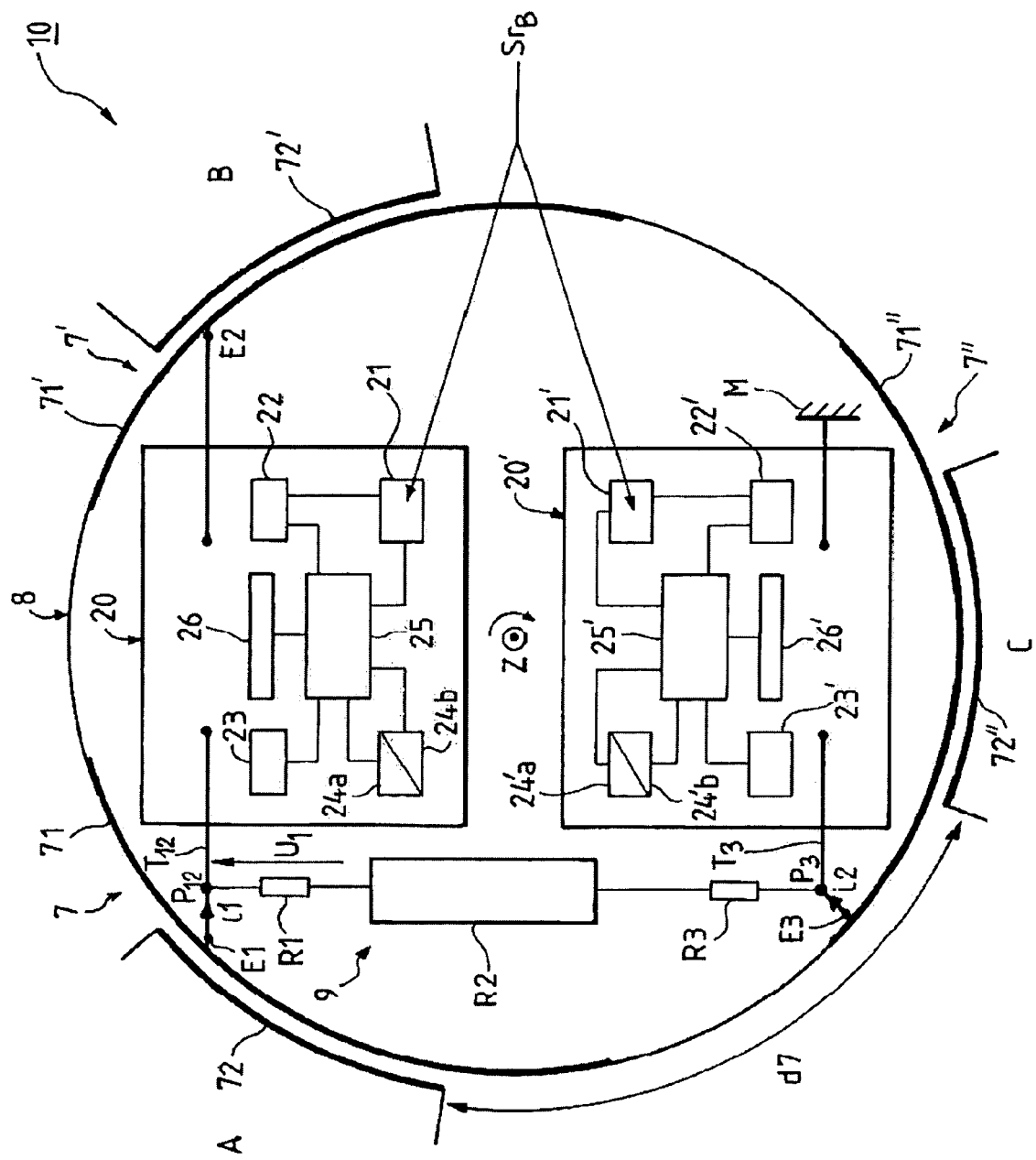
FIG_2

BRANCHING UNIT WITH RECONFIGURABLE TERMINAL CONNECTIONS

CROSS-REFERENCE TO RELATED APPLICATIONS

This application is based on French Patent Application No. 03 01 585 filed Feb. 11, 2003, the disclosure of which is hereby incorporated by reference thereto in its entirety, and the priority of which is hereby claimed under 35 U.S.C. § 119.

BACKGROUND OF THE INVENTION

1. Field of the Invention

The present invention relates to a branching unit for a submarine telecommunication system.

2. Description of the Prior Art

Submarine systems were originally installed to connect two terrestrial optical and electrical power supply terminals (also known as power feed equipments (PFE)) on either side of the Atlantic Ocean, for example. A later improvement comprised three terrestrial optical and electrical power supply terminals connected by a branching unit. Accordingly, in terms of its electrical function, each terminal is connected to one end of an electrical conductor the other end of which is connected to one of the three terminals of the branching unit.

By extension, there can be more than three terrestrial terminals interconnected by the appropriate number of conductor segments and branching units, each of the latter always having three terminals.

In operation, and at a given time, a trunk current, typically of 1A, flows between two of the three terminals, the first connection fed with power in this way being defined as a trunk. A branch current flows between a marine ground attached to the branching unit and the last of the three terminals, which is isolated from the trunk, and the second connection fed with power in this way is defined as a branch.

There are therefore three configurations, depending on the terrestrial terminal chosen for the branch. The basic electrical function of a branching unit is to provide a choice between the three configurations.

A standard branching unit comprises three relays each comprising a contact and a coil that opens the associated contact when it is supplied with current.

The contacts are normally closed: the three terminals are connected and no current flows. If trunk current is sent from one of the trunk terminals, it flows in the coil that controls the contact associated with the "branch" terminal and connected to the last terminal. Opening the contact isolates the branch from the trunk. When the trunk current reaches a sufficient value, the third terminal is connected to the submarine ground.

At present, a reconfiguration, i.e. a change of trunk and branch, is initiated by the users of the terminals that send the relays of the branching unit currents suitable for the appropriate switching actions.

Human error can therefore create an unwanted configuration and likewise a transient disturbance can reduce the trunk current and create a fortuitous reconfiguration.

It has been proposed to add optically controlled additional relays to the branching unit, to lock or unlock the existing configuration, managing the isolation of the branch.

However, both the architecture and the use of the branching unit become more complex. New states are created between the passage from one configuration to another. The reconfiguration process is therefore difficult to use. Furthermore, the locking/unlocking functions are not offered for the contacts associated with the trunk.

Finally, because of the new relays, the branching unit does not protect the system against human error leading to closing of a relay when live, which is known as hot switching, and which is liable to damage the relay.

The object of the invention is to guard against accidental reconfiguration and hot switching and to simplify reconfiguration procedures.

SUMMARY OF THE INVENTION

To this end, the present invention proposes a branching unit adapted to be integrated into a submarine telecommunication system comprising at least three cables having optical and electrical transmission members, the unit comprising three terminals connected to the electrical transmission members of the cables, three input points, and three electrical contacts each between one of the terminals and one of the input points, in which unit, in an operating configuration, and at a given time, a first terminal and a second terminal are electrically connected together and form a trunk segment adapted to convey a trunk current, and a third terminal is electrically connected to a submarine ground to form a branch segment adapted to convey a branch current, the branching unit further comprising reconfiguration means adapted to control the electrical contacts for switching purposes, voltage measuring means for measuring a voltage indicating the potential at a point on the trunk segment, means for receiving and processing optical reconfiguration signals, any optical reconfiguration request being made by means of an optical reconfiguration signal, and reconfiguration validation means coupled to the voltage measuring means and to the reception and processing means and adapted to activate the reconfiguration means in accordance with the optical reconfiguration signal only if the absolute value of the potential is below a threshold.

The invention provides a simple solution to the problem of control by current only, preventing accidental reconfiguration and hot switching, through a double level of authorization: a conforming optical request is applied subject to the value of the potential on the trunk segment.

Moreover, the potential on the trunk segment, which depends on its position relative to the two terrestrial terminals and their respective potentials, can reach several kV. In the prior art, any fortuitous switching at this level of potential risks damaging the contacts.

The value of the threshold is therefore made low, to prevent the contacts closing at a high voltage that might destroy them.

Thus, the branching unit according to the invention remains operational but is self-protected.

The voltage measuring means can advantageously be associated with a voltage divider between said point of the trunk segment and a point of the branch segment.

Thus a low voltage proportional to the voltage between these two segments is measured, which protects the components of the measuring means.

The voltage divider can be of the resistive type and comprise at least one first resistor connected at one end to one of said trunk segment points and branch segment points and at the other end to a second resistor having a higher value than the first resistor and which is connected to the other of said trunk segment points and branch segment points.

A resistive voltage divider is preferred over a capacitive divider because of its longer service life.

The threshold is preferably less than or equal to 100 V.

In a preferred embodiment, the three sliding electrical contacts are electromechanical.

Each electrical contact is formed of a mobile first conductive part and a second conductive part, the mobile first parts being fastened to the second parts in the operating configuration and sliding on the second parts for switching.

This particular structure of the sliding contacts has the advantage over relay contacts of being insensitive to current fluctuations and simplifies the architecture of the branching unit, the coils no longer being necessary.

In an advantageous embodiment, the conductive mobile parts are fastened to the same mobile support to allow simultaneous switching, in order to reduce the number of switching steps to be carried out.

The switching operations are preferably coupled and the length of the mobile conductive parts is greater than the gaps between two second parts.

For all three operating configurations, the trunk current flows in the same electrical line between the first and second input points and the branch current flows in another electrical line between the third input point and the marine ground. Also, the same means according to the invention are used for each of the three configurations.

The input terminals are therefore assigned to the fixed electrical line by the required operating configuration. Thanks to the mobility of the first part, this assignment is obtained by adjusting the positions of the contacts.

Furthermore, the chosen lengths guarantee that there is no open circuit position: there is a transitory double contact during coupled switching. The contacts are protected from the arcing phenomena that occur when live contacts are opened.

Furthermore, the transitory double contacts do not represent a problem: the double contact positions ground the terminals, which is not a problem, especially if the trunk segment and the branch segment are substantially at potentials close to 0 V.

The sliding contacts can advantageously be rectilinear or about a rotation axis.

The branching unit according to the invention preferably comprises means for identifying the existence and the sign of the trunk current at the first and second terminals and the existence and the sign of the branch current at the third terminal.

Furthermore, said optical request defines which two of the three terminals are to be used to form a reconfigured trunk, and the reconfiguration validation means are then adapted to authorize the optical request only if the currents at the terminals defined for the reconfigured trunk are of opposite sign or zero in the operating configuration.

The branching unit preferably comprises memory means for storing the optical configuration signal, for example for a given delay and/or until the reconfiguration is validated.

In an advantageous embodiment, the branching unit comprises at least one first electronic control card supplied with power by one of the trunk and branch currents and incorporating all of said means.

It preferably comprises a second electronic control card supplied with power by the other of the trunk and branch currents and comprising means similar to said means of the first card.

If a fault in the branch creates a short circuit to the sea, for example, one of the two cards is no longer supplied with power and therefore can no longer manage validation of reconfiguration. Thus, using two cards improves the protection of the branching unit even in the event of problems on the network and protects against accidental reconfiguration.

The invention naturally applies to a submarine telecommunication system comprising at least three equipments chosen from terrestrial terminals and branching units and connected to the cables, at least one of the equipments being connected to or corresponding to a terrestrial terminal comprising means for sending optical configuration signals, and at least one branching unit as defined hereinabove.

The invention applies equally to a method of reconfiguring a submarine telecommunication system as defined hereinabove, the method comprising sending the optical reconfiguration signal to the branching unit, voltage measurement by the voltage measuring means, validation of reconfiguration in accordance with the optical reconfiguration signal if the absolute value of the potential is below the threshold, and reconfiguration comprising switching the electrical contacts.

The switching is preferably effected by simultaneous and coupled movement of the first parts of the sliding contacts.

A first embodiment of the method comprises, before said sending operation, an operation of adjusting the voltages at the terrestrial terminals associated with the trunk current, so as to obtain said threshold with the trunk current maintained.

A second embodiment of the method comprises, after said sending operation, an operation of progressively correcting the voltages at the terrestrial power supply terminals associated with the trunk current, so as to obtain said threshold with the trunk current maintained.

Features and advantages of the invention will become clearly apparent on reading the following description, which is given by way of illustrative and nonlimiting example and with reference to the appended drawings.

BRIEF DESCRIPTION OF THE DRAWINGS

FIG. 1 shows diagrammatically a submarine telecommunication system integrating a branching unit constituting a preferred embodiment of the invention.

FIG. 2 is a diagrammatic representation of the FIG. 1 branching unit.

DETAILED DESCRIPTION OF THE PREFERRED EMBODIMENT

FIG. 1 shows a submarine telecommunication system 100 integrating a branching unit 10 constituting a preferred embodiment of the invention.

The submarine telecommunication system 100 comprises three terrestrial optical and electrical power supply terminals 1A, 1B, 1C respectively connected to one end of three cables 2A, 2B, 2C each comprising an optical fiber 3A, 3B, 3C for the propagation of optical signals S and an electrical conductor 4A, 4B, 4C.

Each electrical conductor 4A, 4B, 4C is further connected to a respective terminal A, B, C of the branching unit 10.

In a first operating configuration chosen by way of example, the trunk is the connection between the first and second terminals 1A, 1B at respective variable voltages VA, VB respectively equal to +6 kV and −4 kV, for example.

The first terminal A and the second terminal B are electrically connected, forming a trunk segment (shown in dashed line) at a potential of +3 kV, for example. Thus a trunk current i1 flows from the first terminal 1A to the second terminal 1B, the first terminal A is the trunk current input terminal, and the second terminal B is the trunk current output terminal.

Moreover, the branch is the connection between the third terminal 1C at an adjustable voltage VC equal to +10 kV, for example, and a marine ground M of the branching unit 10. A branching current i2 therefore flows from the third terminal 1C to the marine ground M, the third terminal C is the input terminal for the branch current i2 and forms with the marine ground a branch segment (shown in dashed line) at a potential close to 0 V.

According to the invention, a reconfiguration request is optical and consists in sending an optical reconfiguration signal containing reconfiguration information.

An optical reconfiguration signal $Sr_B$ is delivered, for example via a coupler 5B in the optical fiber 3B, to first means 21 for receiving and processing optical reconfiguration signals, preferably duplicated by similar second means 21', or even triplicated. The means 21, 21' are preferably capable of receiving and decoding any optical reconfiguration signal $Sr_A$, $Sr_B$, $Sr_C$ coming from any of the terminals 1A, 1B, 1C provided with appropriate sending means (not shown).

FIG. 2 shows diagrammatically the branching unit 10 whose architecture is described in detail mainly in association with its electrical connection function.

The branching unit 10 comprises three input points E1, E2, E3 in electrical contact with the respective terminals A, B, C in the first operating configuration shown in FIG. 1 via three electromechanical contacts 7, 7', 7" that are preferably sliding contacts. Thus the terminals A and B are linked to form the trunk segment including the electrical circuit T12 and the terminal C and the ground M are linked to form the branch segment including the electrical circuit T3.

The electrical circuit T12 is assigned to the trunk current and the electrical circuit T3 is assigned to the branch current in all configurations.

Each sliding contact 7, 7', 7" is formed of a first conductive mobile part (shown in thicker line) 71, 71', 71" and a fixed second conductive part 72, 72', 72" (also shown in thicker line). In the first operating configuration the first mobile parts 71, 71', 71" are fastened to the respective second parts 72, 72', 72".

The mobile parts 71, 71', 71" are fastened to the same mobile support 8 for simultaneous and preferably coupled switching.

The lengths of the mobile parts 71, 71', 71" are greater than the spaces d7 between two second parts 72, 72', 72", which creates double transient contacts during the three simultaneous switching operations.

The branching unit 10 further comprises a first electronic control card 20 supplied with power by the trunk current i1 and which includes:
first means 21 for receiving and processing optical reconfiguration signals $Sr_B$,
preferably, first memory means 22 for storing optical configuration signals,
first voltage measuring means 23 for measuring a voltage $U_1$ indicating the potential at any point of the trunk segment $P_{12}$, for example at the trunk current input,
preferably, first identification means 24a for identifying the existence and the sign of the trunk current and first identification means 24b for identifying the existence and the sign of the branch current,
first reconfiguration validation means 25 coupled to the means 21 to 24 and adapted to authorize or prohibit reconfiguration, and
first reconfiguration means 26 coupled to the reconfiguration validation means 25 and adapted to command the switching of the contacts 7, 7', 7" after validation.

The branching unit 10 preferably comprises a second electronic control card 20' supplied with power by the branch current i2 and which includes second means 21' to 26' similar to the first means 21 to 26.

Reconfiguration is therefore effected when at least two conditions are satisfied:
an optical reconfiguration and where applicable decoding signal is received for reading configuration information,
the absolute value of the potential on the trunk segment is below a threshold that is preferably less than or equal to 100 V.

Furthermore, as the optical request defines two of the three terminals to form a trunk, reconfiguration is preferably authorized when the currents at the two terminals chosen for the trunk are zero or of opposite sign in the first configuration.

For example, starting from the first configuration, a reconfiguration defining the terminal B in a branch and the terminals A and C in a reconfigured trunk is prohibited, whereas reconfiguration by defining the terminal A in a branch and the terminals C and B in a reconfigured trunk is permitted.

The first and second voltage measuring means 21, 21' are associated with a standard voltage divider 9 between the point $P_{12}$ of the trunk segment and any point $P_3$ of the branch segment, for example at the input for the branch current i2.

The voltage divider 9 is preferably of the resistive type and comprises a first resistor R1 connected at one end to the point $P_{12}$ of the trunk segment and in series with a second resistor R2 having a value very much higher than that of the first resistor and itself in series with a third resistor R3 similar to the first resistor R1 and connected to the point $P_3$ of the branch segment.

If reconfiguration is authorized, there are three switching actions: the mobile parts 71, 71', 71" slide on the second parts 72, 72', 72" about a rotation axis Z by virtue of rotation of the mobile support 8.

For example, for reconfiguration with the terminal A in a branch, the mobile support 8 rotates 120° clockwise. During switching, the mobile parts 71, 71', 71" come into common contact with the second parts 72, 72', 72" and other second parts 72', 72", 72, respectively.

Of course, the logic controlling movement of the mobile support 8 is adjusted to ensure that the parallel operation of the first and second reconfiguration means 26, 26' leads only to the required switching actions.

The reconfiguration method according to the invention therefore comprises:
sending the optical reconfiguration signal $Sr_B$ to the branching unit 10,
voltage measurement by the first and/or second voltage measuring means 23, 23',
validating reconfiguration by the first and/or second reconfiguration validation means 25, 25', in accordance with said optical reconfiguration signal if the absolute value of the potential of the trunk segment $P_{12}$ is below the threshold, and
reconfiguration by switching the electrical contacts 7, 7', 7" under the control of the first and/or second reconfiguration means 26, 26'.

In a first method, to achieve validation, sending is preceded by adjusting the variable voltages VA, VB at the terrestrial trunk terminals 1A, 1B to reach the threshold whilst maintaining the trunk current.

In a second method, to achieve validation, sending is followed by progressively correcting the variable voltages VA, VB at the terrestrial trunk terminals 1A, 1B to reach the threshold whilst maintaining the trunk current.

In the chosen example, if the voltage VA becomes equal to +3 kV and the voltage VB becomes equal to −7 kV, the potential at $P_{12}$ on the trunk segment is 0 V: the measured voltage U1 is therefore below the threshold: reconfiguration in accordance with an optical reconfiguration signal is possible.

In a variant of the preferred embodiment, the contacts move in a straight line.

Of course, the foregoing description has been given by way of illustration only. Any means can be replaced by equivalent means without departing from the scope of the invention.

What is claimed is:

1. A branching unit adapted to be integrated into a submarine telecommunication system comprising at least three cables having optical and electrical transmission members, said branching unit comprising:

three terminals connected to the electrical transmission members of the cables;

three input points;

three electrical contacts each between one of said terminals and one of said input points, wherein, in an operating configuration, and at a given time, first and second terminals of said three terminals are electrically connected together and form a trunk segment adapted to convey a trunk current, and the third terminal of said three terminals is electrically connected to a submarine ground to form a branch segment adapted to convey a branch current;

reconfiguration means adapted to control said electrical contacts for switching purposes;

voltage measuring means for measuring a voltage indicating a potential at a point on said trunk segment;

means for receiving and processing an optical reconfiguration signal indicative of a reconfiguration request; and reconfiguration validation means coupled to said voltage measuring means and to said receiving and processing means and adapted to activate said reconfiguration means in accordance with said optical reconfiguration signal only if an absolute value of said potential is below a threshold.

2. The branching unit claimed in claim 1 wherein said voltage measuring means are associated with a voltage divider between said point on said trunk segment and a point on said branch segment.

3. The branching unit claimed in claim 2 wherein said voltage divider is of the resistive type and comprises at least one first resistor connected to one end of one of said trunk segment points and branch segment points and at the other end to a second resistor of greater value than said first resistor and connected to the other of said trunk segment points and branch segment points.

4. The branching unit claimed in claim 1 wherein said threshold is less than or equal to 100 V.

5. The branching unit claimed in claim 1 wherein said three electrical contacts are electromechanical, each electrical contact is formed of a mobile first conductive part and a second conductive part, and said first mobile parts are fastened to said second conductive parts in an operating configuration and slide on said second conductive parts for switching.

6. The branching unit claimed in claim 5 wherein said mobile first conductive parts are commonly fastened to a mobile support for simultaneous switching, and lengths of said mobile first conductive parts are greater than distances between said second conductive parts.

7. The branching unit claimed in claim 5 wherein said electrical contacts are chosen from contacts that move in a straight line and contacts that move about a rotation axis.

8. The branching unit claimed in claim 1 comprising means for identifying an existence and a sign of said trunk current at said first and second terminals and means for identifying an existence and a sign of said branch current at said third terminal and wherein said optical reconfiguration request specifies two of said three terminals to form a reconfigured trunk and said reconfiguration validation means are adapted to authorize said reconfiguration request only if the currents at the terminals defined for said reconfigured trunk are of opposite sign or zero in the operating configuration.

9. The branching unit claimed in claim 1 comprising means for storing said optical reconfiguration signal.

10. The branching unit claimed in claim 1 comprising at least one first electronic control card supplied with power by one of said trunk and branch currents and incorporating said reconfiguration means, said voltage measuring means, said means for receiving and processing, and said reconfiguration validation means, and a second electronic control card supplied by the other of said trunk and branch currents.

11. A submarine telecommunication system comprising at least three equipments chosen from terrestrial terminals and branching units and connected to cables having optical and electrical transmission members, at least one of said equipments being connected to or corresponding to a terrestrial terminal comprising means for sending optical configuration signals, and at least one branching unit comprising:

three terminals connected to the electrical transmission members of the cables;

three input points;

three electrical contacts each between one of said terminals and one of said input points, wherein, in an operating configuration, and at a given time, first and second terminals of said three terminals are electrically connected together and form a trunk segment adapted to convey a trunk current, and the third terminal of said three terminals is electrically connected to a submarine ground to form a branch segment adapted to convey a branch current;

reconfiguration means adapted to control said electrical contacts for switching purposes;

voltage measuring means for measuring a voltage indicating a potential at a point on said trunk segment:

means for receiving and processing an optical reconfiguration signal indicative of a reconfiguration request; and reconfiguration validation means coupled to said voltage measuring means and to said receiving and processing means and adapted to activate said reconfiguration means in accordance with said optical reconfiguration signal only if an absolute value of said potential is below a threshold.

12. A method of reconfiguring a submarine telecommunication system comprising at least three equipments chosen from terrestrial terminals and branching units and connected to cables having optical and electrical transmission members, at least one of said equipments being connected to or corresponding to a terrestrial terminal comprising means for sending optical configuration signals, and at least one branching unit comprising three terminals connected to the electrical transmission members of the cables, three input points, three electrical contacts each between one of said terminals and one of said input points, wherein, in an operating configuration, and at a given time, first and second terminals of said three terminals are electrically connected together and form a trunk segment adapted to convey a trunk current, and the third terminal of said three terminals is electrically connected to a submarine ground to form a branch segment adapted to convey a branch current, said method comprising:

- sending an optical reconfiguration signal to one of said branching units, said optical reconfiguration signal being indicative of a reconfiguration request;
- measuring a voltage indicating a potential at a point on said trunk segment; and
- performing reconfiguration in accordance with said optical reconfiguration signal if the absolute value of said potential is below a threshold, said reconfiguration comprising switching said electrical contacts.

13. The method claimed in claim 12 wherein said three electrical contacts are electromechanical, each electrical contact is formed of a mobile first conductive part and a second conductive part, said first mobile parts are fastened to said second conductive parts in an operating configuration and slide on said second conductive parts for switching, and switching is effected by simultaneous and coupled movements of said mobile first conductive parts.

14. The method claimed in claim 12 comprising, before sending said optical reconfiguration signal, adjusting voltages at said terrestrial terminals associated with said trunk current to obtain said threshold while maintaining said trunk current.

15. The method claimed in claim 12 comprising, after sending said optical reconfiguration signal, progressively correcting voltages at said terrestrial terminals associated with said trunk current in order to obtain said threshold while maintaining said trunk current.

* * * * *